US005701800A

United States Patent [19]

Kaup

[11] Patent Number: 5,701,800

[45] Date of Patent: Dec. 30, 1997

[54] PRESSURE MEDIUM DRIVE WITH A CYLINDER AND A PLUNGER

[75] Inventor: Otmar Kaup, Aschaffenburg, Germany

[73] Assignee: Kaup GmbH & Co. KG, Aschaffenburg, Germany

[21] Appl. No.: 786,097

[22] Filed: Jan. 17, 1997

[30] Foreign Application Priority Data

Jan. 25, 1996 [DE] Germany ........................ 196 02 553.2

[51] Int. Cl.$^{6}$ ........................ F16J 15/18

[52] U.S. Cl. ........................ 92/128; 92/168

[58] Field of Search ........................ 92/128, 165 R, 92/168

[56] References Cited

U.S. PATENT DOCUMENTS

| | | | |
|---|---|---|---|
| 3,391,612 | 7/1968 | Sneen | 92/128 |
| 3,748,913 | 7/1973 | Quiney | 92/168 |
| 4,085,661 | 4/1978 | Schrieven | 92/128 |
| 5,245,911 | 9/1993 | Yuda | 92/128 |

FOREIGN PATENT DOCUMENTS

| | | |
|---|---|---|
| 2756824 | 6/1978 | Germany . |
| 3635020 | 11/1987 | Germany . |

*Primary Examiner*—Thomas E. Denion

*Attorney, Agent, or Firm*—Felfe & Lynch

[57] ABSTRACT

A support with a through-hole (13) for a plunger (3) and a contact surface (15) for a sealing ring (8), is designed as a sliding body (12) with two .diametrically opposite sliding shoulders, which are inserted in complementary transverse grooves (9, 10) in the end of a cylinder (1). After the sliding body (12) has been inserted, it is held in place in the cylinder by the plunger (3). The sliding body (12) is provided with an annular channel inside the through-hole, in which channel a wiper ring (17) is set.

6 Claims, 5 Drawing Sheets

PRESSURE MEDIUM DRIVE WITH A CYLINDER AND A PLUNGER

BACKGROUND OF THE INVENTION

The invention pertains to a pressure medium drive with a cylinder with a cylinder chamber, a radially guided piston, a sealing ring, and a replaceable support with a through-hole for the piston and a contact surface for the sealing ring.

Large numbers of pressure medium drives of this type, which are usually designed as hydraulic drives, are required for, for example, industrial trucks and forklifts, etc. At the end of the cylinder there is a support, which also serves at least in part as a guide for the plunger. This support also absorbs the axial forces of the sealing ring.

In the pressure medium drive of the general type described in DE 36 35 010 A1, a toothed rack, which is connected to a piston, passes through a support in the form of a plug, which closes off the working space. The support is provided with both an internal and an external thread and is held in place in the cylinder by means of a radially pretensioned locking ring consisting of round wire. Because the diameter of the piston is greater than that of the toothed rack, the toothed rack cannot be pulled out through the support. Thus a tool must be used to insert the locking ring into the narrow ring-shaped gap between the toothed rack and the cylinder, and when repairs are needed, it must be removed again from the same ring-shaped gap. Fabrication and repair are therefore complicated, and the round wire represents a weak point in numerous concrete applications where extremely high working pressures are involved.

U.S. Pat. No. 3,391,612 discloses a piston seal of larger cross section than the piston of a hydraulic motor, wherein the seal is connected to the piston by a dovetail joint. So that this connection can be made and taken apart again, a radial opening is provided in the cylinder wall, which is closed by a cover and secured with screws, which can be removed only by means of a tool. The piston itself must remain in the cylinder until the piston seal has been removed; nothing is said about pulling anything out through a hole in a support. With respect to a cover plate located at one end of the piston, which can be referred to as a support, this is also inserted and removed through a radial opening in the cylinder wall. The process of replacing the seals and the associated design are complicated, especially since there is no possibility of using extruded profiles to produce the cylinder. In addition, the radial assembly openings for the seals and their covers represent pronounced weak points with respect to high pressures.

All of the known means of attachment are either unspecific or complicated. It must be remembered that large numbers of pressure medium drives of this type are required.

SUMMARY OF THE INVENTION

The invention provides a pressure medium drive which can be produced easily from fewer parts, in which the support has a precise seat and the sealing ring can be easily replaced.

According to the invention, (a) the piston is designed as a plunger, which can be pulled out through the through-hole and from the sealing ring without removing the support;

(b) the support is designed as a sliding body, which forms a diametral dovetail joint with the end of the cylinder; and (c) the support, after it has been inserted, is held in place with respect to the cylinder by the piston.

It is especially advantageous for the dovetail joint to comprise two diametrically opposite sliding shoulders, which are fit in complementary transverse grooves in the cylinder.

It is also advantageous for the piston to be guided in a guide ring inserted in the cylinder chamber and for the sealing ring to be installed between the guide ring and the sliding body, especially when the guide ring consists of low-friction plastic and is installed in a stepped bore in the cylinder chamber.

Only a few parts are required for the object of the invention, one of these parts being the support, which occupies a precise seat in the open end of the cylinder and which assumes at least part of the job of guiding the piston. It also ensures the precise support of the sealing ring and can be replaced easily. No special collars or threaded bores are required at the end of the cylinder, nor are any additional sealing plates or sealing rings needed.

The plunger itself serves in this case in a surprisingly simple way as a retaining device for the sliding body; no other means of attachment are required. As long as the plunger is in the cylinder, the sliding body cannot be pushed out of the transverse grooves in the cylinder. After the plunger has been pulled out of the cylinder, the sliding body can be pushed out of the transverse grooves in the direction perpendicular to the longitudinal axis of the cylinder, so that then, without any special tools, the sealing ring can also be pulled out of its stepped bore and replaced with a new sealing ring. The sliding body can be reused as often as desired.

According to a variant of the invention, the sliding body has a rectangular outline (including a square outline), when seen in the axial direction, and the sliding shoulders are provided on two opposite sides of the rectangle.

According to another variant of the invention, the sliding body is provided with a ring-shaped groove inside the through-hole for the plunger and for a wiper ring to be inserted in this groove.

This wiper ring can also be easily pried out of the ring-shaped groove and replaced with a new one. As long as the wiper ring is in good condition, it can remain in the sliding body, and after the sealing ring has been replaced, it can be reinstalled together with the sliding body, which is inserted into the transverse grooves and held in place again by the plunger.

DETAILED DESCRIPTION OF THE PREFERRED EMBODIMENTS

Figure 1:
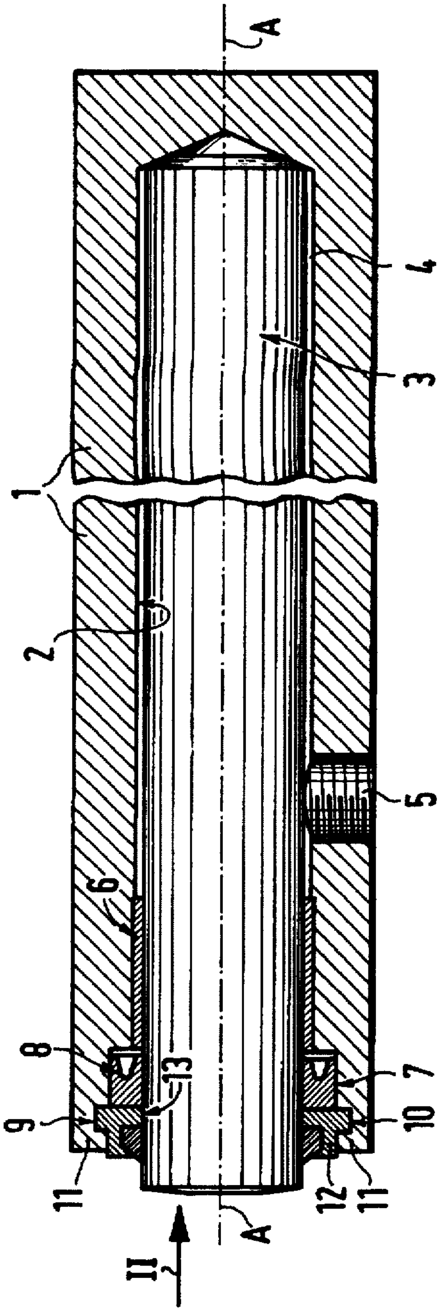
FIG. 1 is an axial cross section through a complete pressure medium drive.

FIG. 1 shows a cylinder 1 with a cylinder chamber 2, in which a piston 3 is provided, which is also referred to as a plunger. Because of the difference between the diameter of cylinder chamber 2 and the diameter of plunger 3, an annular gap 4 is created, into which a connecting bore 5 for a hydraulic line (not shown) opens.

The end of cylinder chamber 2 has a slightly expanded diameter, and a guide ring 6, which consists of a low-friction plastic such as polyamide, is inserted into this expansion. Following the expansion is a stepped bore 7, into which a sealing ring 8 is inserted, which is designed as a grooved ring or lip seal as shown.

Following after this stepped bore 7 are in turn two parallel transverse grooves 9, 10, which have a prismatic cross section and which extend crosswise through the entire cylinder 1; that is, they are open at both ends. Each of these transverse grooves 9, 10 is bordered on the side facing the end of cylinder 1 by a retaining shoulder 11, these shoulders being parallel to the associated transverse grooves 9, 10. Together, the shoulders and the grooves form sliding seats.

A sliding body 12 is inserted in the diametral direction into transverse grooves 9, 10, this body having a through-hole 13 for plunger 3. As can be seen in FIG. 1, sliding body 12 forms a support for sealing ring 8, which is subjected to the pressure of the hydraulic fluid, which can be as high as 300 bars, acting in the direction toward the cylinder opening, although this value does not represent a critical upper limit.

Figure 2:
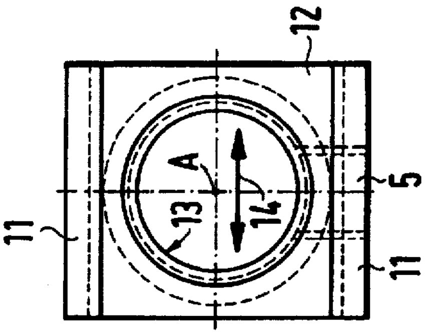
FIG. 2 is an end view of the drive in the direction of arrow II in FIG. 1.

As can be seen from FIG. 2, sliding body 12 can be pushed out in either direction as shown by double arrow 14, perpendicular to axis A. In the axial direction, however, sliding body 12 is held reliably in position by transverse grooves 9, 10 and retaining shoulders 11.

Figure 3:
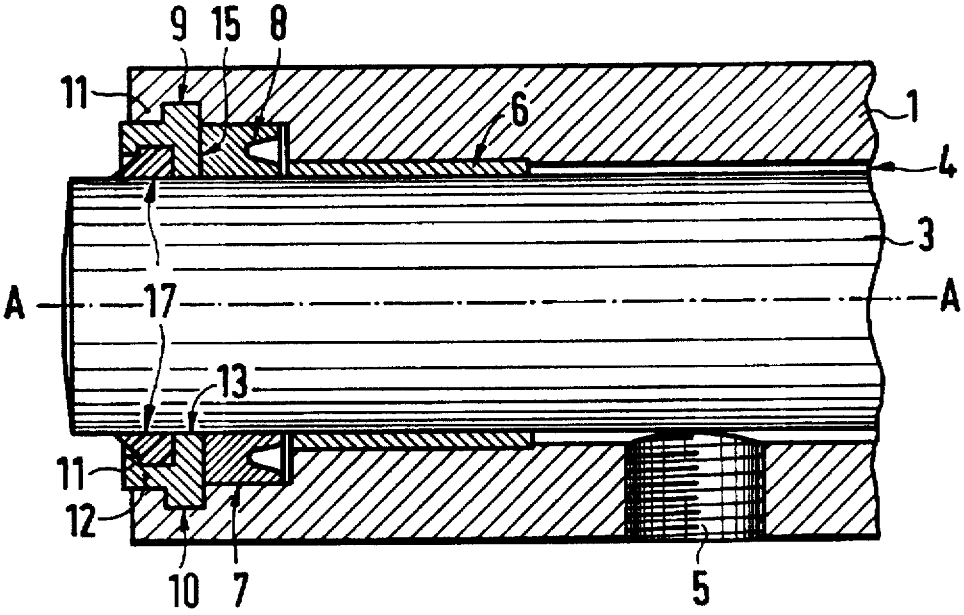
FIG. 3 is a partial axial section on an enlarged scale.

As can be seen additionally from FIG. 3, sliding body 12 has a contact surface 15 for sealing ring 8 and, on the opposite side, an annular channel 16 (FIG. 4) inside through-hole 13, for the acceptance of a wiper ring 17. This wiper ring can be reused again if found in good condition; it does not require a metal holder, because sliding body 12 takes over this function as well. As can be derived especially well from FIG. 3, wiper ring 17 is held in all directions by the walls annular channel 16 and by plunger 3; it can be easily pried or rolled out, however, after plunger 3 has been removed.

Figure 4:
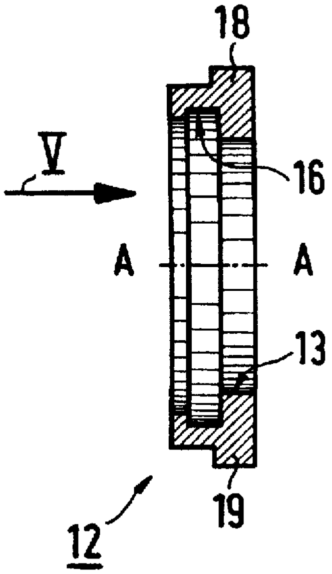
FIG. 4 is a side cross section through the sliding body along line IV—IV of FIG. 5.
Figure 5:
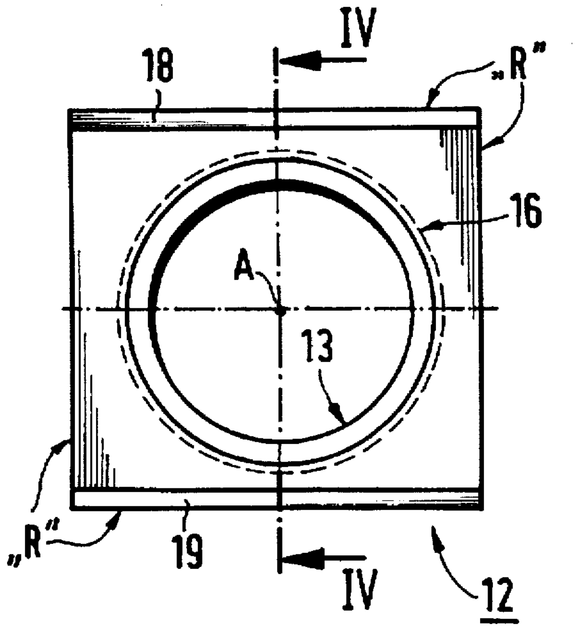
FIG. 5 is an end view of the sliding body, in the direction of arrow V in FIGS. 4 and 4A.
Figure 3A:
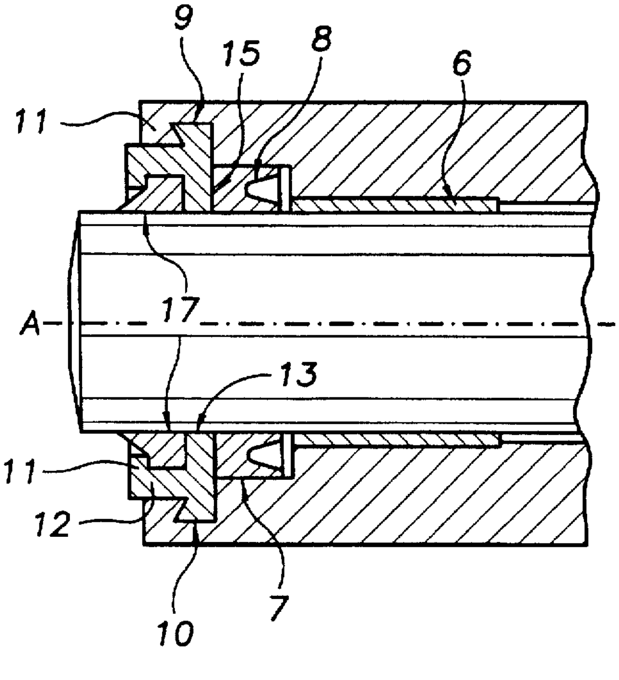
FIG. 3*a* is a partial axial section showing a dovetail joint.
Figure 4A:
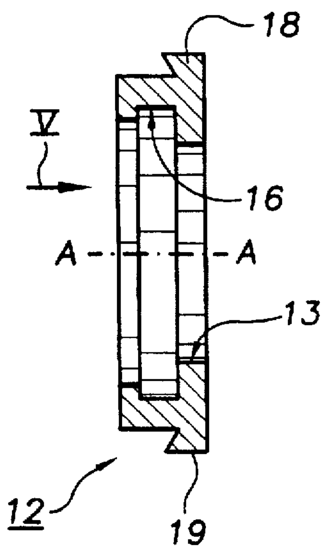
FIG. 4*a* is a side section through a sliding body having a dovetail.

As can be seen from FIGS. 4 and 5, sliding body 12 has a rectangular outline when seen in the axial direction according to arrow V, and two parallel sliding shoulders 18, 19 are provided on opposite sides of rectangle R. These Shoulders are also prismatic in cross section and are located and designed to fit into transverse grooves 8, 9. As shown in FIGS. 3*a* and 4*a* , the shoulders 18, 19 can be configured as dovetails for reception in correspondingly configured grooves 9, 10, which ensures that sliding body 12 is seated with extreme precision.

Figure 6:
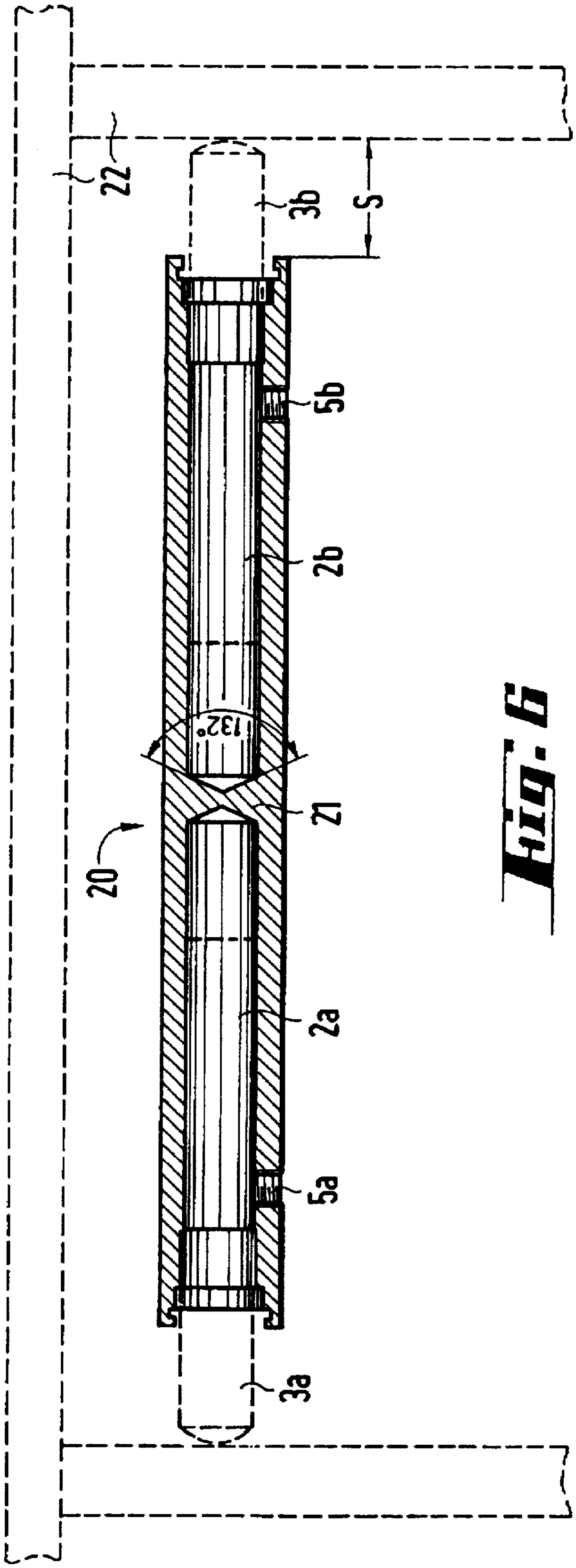
FIG. 6 is an axial cross section through a double-sided pressure medium drive, of a type which can be used in so-called side loaders for the forks of forklift trucks.

FIG. 6, furthermore, shows a double cylinder 20 with two cylinder chambers 2*a*, 2*b*, which are separated from each other by a partition wall 21. By means of two connecting holes 5*a*, 5*b*, the two cylinder chambers 2*a*, 2*b* can be actuated independently of each other. Because, in the case of plungers of this type, an external stop is required to limit their stroke, these types of pressure medium drives are frequently, although not exclusively, used for so-called side loaders with a side loading frame 22, the upper part of which as well as plungers 3*a*, 3*b* are shown in broken line in FIG. 6. By the alternating actuation of the two plungers 3*a*, 3*b*, side loading frame 22 can be shifted in either direction by a distance "s". For example, when plunger 3*a* is pushed out, plunger 3*b* is pushed in by the same distance. In any case, however, side loading frame 22, which fulfills the required stop function, prevents plungers 3*a* and/or 3*b* from escaping from their cylinders. After side loading frame 2 has been removed, sealing rings 8 and possibly also wiper rings 17 can be replaced as follows:

1. Remove plunger.
2. Push sliding body 12 sideways out of transverse grooves 9, 10.
3. Replace sealing ring 8 and possibly also wiper ring 17.
4. Push sliding body back into place from the side.
5. Reinsert plunger in the axial direction.

Figure 7:
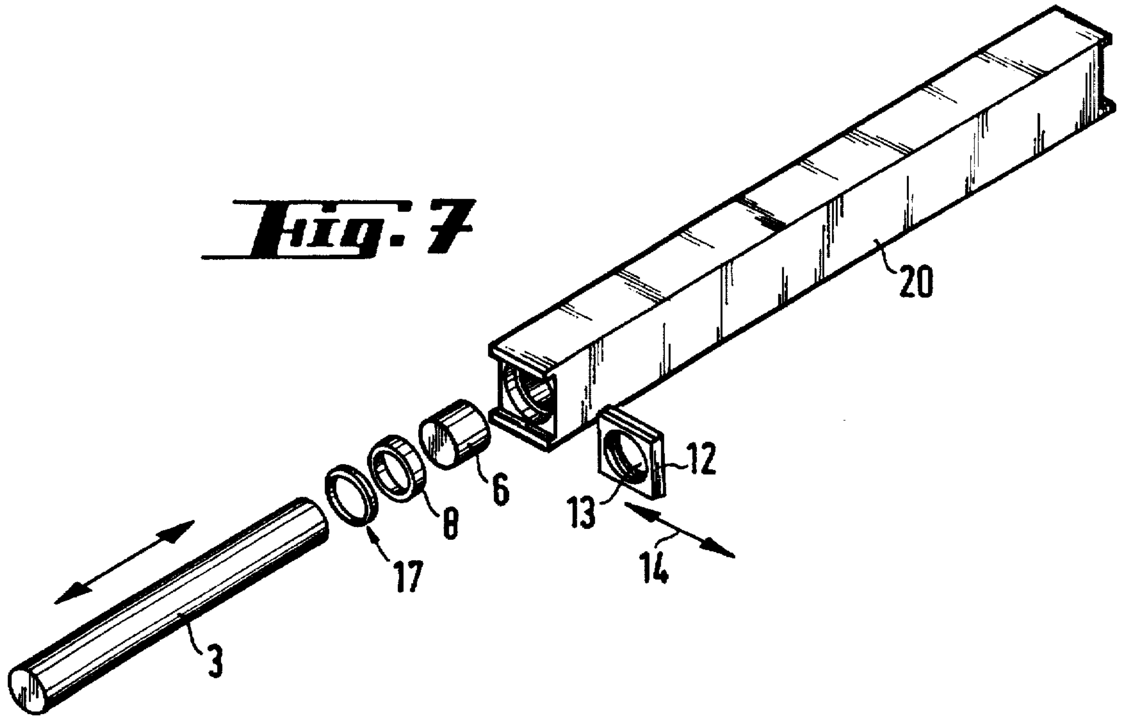
FIG. 7 is an exploded perspective of the drive according to FIGS. 1–5 in conjunction with a double cylinder according to FIG. 6.
Figure 8:
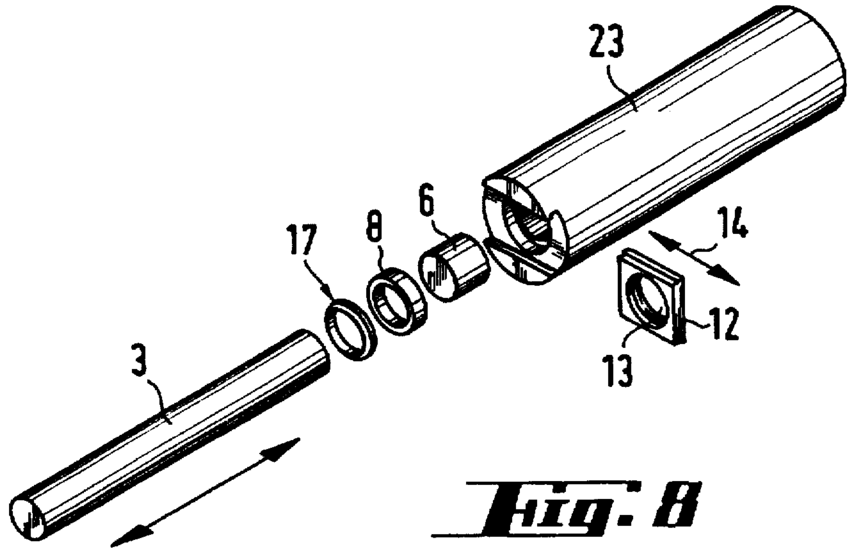
FIG. 8 is an exploded perspective of an alternative embodiment.

The idea of the invention is applicable both to cylinders with rectangular or square outlines (FIG. 7) and to cylinders which have, for example, a cylindrical external surface FIG. 8). In FIGS. 7 and 8, analogous parts are designated by the same reference numbers. In FIG. 8, cylinder 1 according to FIG. 1 is replaced by a cylinder 23 with a cylindrical external surface, the cylinder wall being thick enough to ensure that transverse grooves 9, 10 and sliding shoulders 18, 19 are of sufficient length.

I claim:

1. Pressure medium drive comprising a housing with a cylindrical chamber having a central axis, said housing having an end at which said cylindrical chamber opens, a stepped bore concentric to said central axis, and a pair of grooves extending transversely of said axis on opposite sides of said cylindrical chamber at said end of said housing, a sealing ring received in said stepped bore, a support slideably received in said grooves to hold said sealing ring in said stepped bore, said support having a through-hole which aligns with said cylindrical chamber and said sealing ring, and a plunger slideably received in said through-hole, said sealing ring, and said cylindrical chamber, thereby holding said support in place against movement in said grooves transversely of said axis.

2. Pressure medium drive as in claim 1 wherein said support is provided with opposed shoulders profiled for reception in respective said grooves as dovetail joints.

3. Pressure medium drive as in claim 1 wherein said support is profiled as a rectangle having opposed parallel shoulders profiled for sliding reception in said grooves.

4. Pressure medium drive as in claim 1 wherein said support comprises an annular channel which is concentric to said through hole, said drive further comprising a wiper ring received in said annular channel so that said wiper ring makes sliding contact with said plunger.

5. Pressure medium drive as in claim 1 further comprising a guide ring in said cylindrical chamber, said sealing ring being located between said guide ring and said support, said plunger being guided in said guide ring.

6. Pressure medium drive as claim 5 wherein said guide ring is plastic.

* * * * *

UNITED STATES PATENT AND TRADEMARK OFFICE
CERTIFICATE OF CORRECTION

PATENT NO. : 5,701,800
DATED : December 30, 1997
INVENTOR(S) : Otmar Kaup

It is certified that error appears in the above-identified patent and that said Letters Patent is hereby corrected as shown below:

Title page,
Item [30], Foreign Application Priority Data, the German patent serial number should be -- 196 02 553.2-53 --.

Column 3,
Line 53, "Shoulders" should be -- shoulders --.

Signed and Sealed this

Twenty-second Day of April, 2003

JAMES E. ROGAN
*Director of the United States Patent and Trademark Office*